Feb. 24, 1970     O. D. GIFFORD     3,496,977
POWER MOWER CLIPPING-COLLECTING ATTACHMENT-BLOWER
UNIT THEREFOR
Original Filed Jan. 15, 1965     2 Sheets-Sheet 1
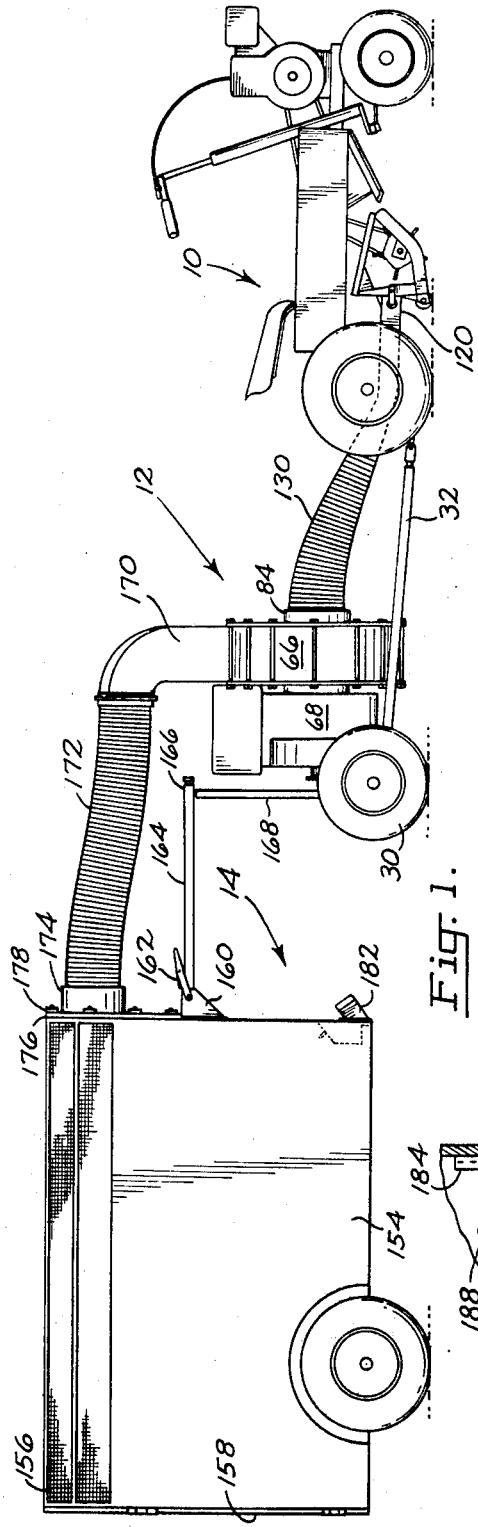
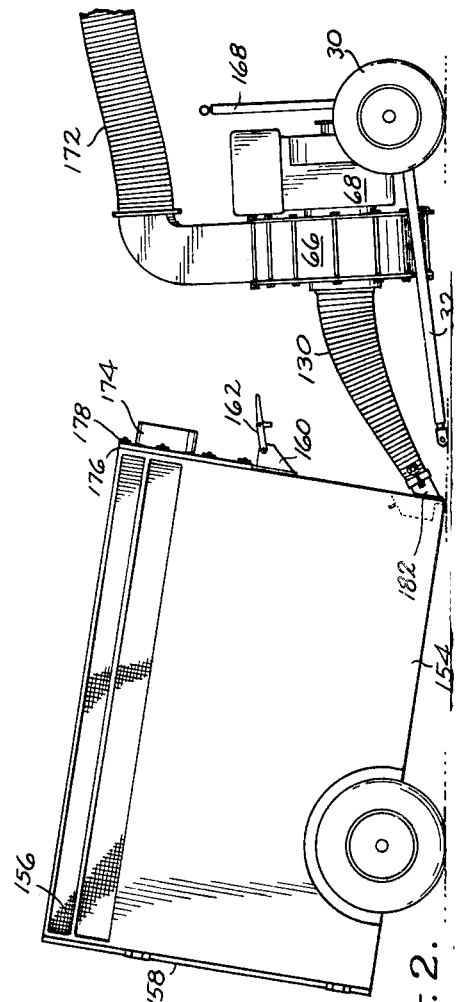
Oscar D. Gifford
INVENTOR.
BY *Eugene D. Farley*
*Atty*

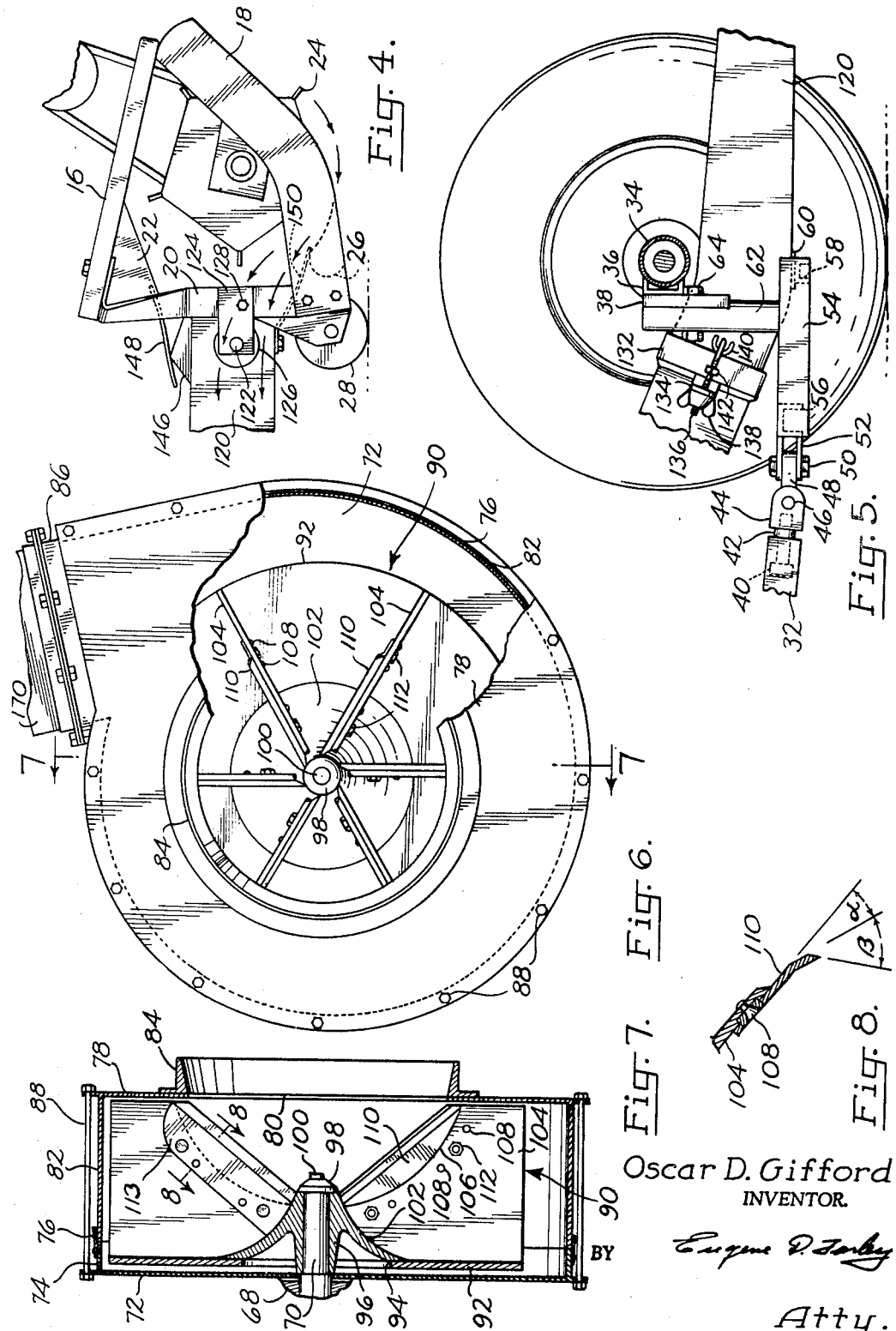

United States Patent Office 3,496,977
Patented Feb. 24, 1970

3,496,977
POWER MOWER CLIPPING-COLLECT-
ING ATTACHMENT - BLOWER UNIT
THEREFOR
Oscar D. Gifford, 1003 N. Central,
Olympia, Wash. 98502
Original application Jan. 15, 1965, Ser. No. 425,870, now
Patent No. 3,367,092, dated Feb. 6, 1968. Divided
and this application Jan. 17, 1968, Ser. No. 723,961
Int. Cl. A01d 35/18, 35/24; B02c 9/04
U.S. Cl. 146—107                                    4 Claims

ABSTRACT OF THE DISCLOSURE

An attachment for a lawn mower comprising a blower with fan blades, each having a concavely arcuate forward surface and a knife blade mounted across said surface and bent angularly along its length in the leading direction so as to sever material being pulled into the blower, said blower having a conical deflector plate mounted on its hub to direct the severed material from the intake to the outlet.

---

This is a division of the patent application of Oscar D. Gifford, Ser. No. 425,870, filed Jan. 15, 1965, now Patent No. 3,367,092, for Power Mower Attachment, which is a continuation-in-part of application Ser. No. 324,977, filed Nov. 20, 1963, now abandoned.

This invention relates to power mower attachments. It pertains particularly to an attachment for reel type power lawnmowers and is described and illustrated herein with particular reference to such use. It is to be understood, however, that it is applicable also to mowers of other types employed for cutting and harvesting various agricultural products.

In the care of lawns, the removal of grass clippings presents a difficult problem. In wet weather the clippings soften, agglomerate and form a wet, sticky mass which later bakes on the lawn. In dry weather the clippings dry out, become strawlike, and form a thatch which is impermeable to rain and irrigation water. In either case, the clippings become nesting places for harmful insects.

One conventional method commonly employed for the removal of grass clippings is the provision of a basket or bag which attaches to the reel-type or rotary-type lawnmower, respectively. The use of such grass catchers is tedious and cumbersome, however, in that it requires stopping the mower frequently, removing the catcher, emptying it at some remote location, and then reattaching it to the mower.

Another procedure which has been developed for removing grass clippings from lawns is the application of a vacuum cleaner which picks up the grass clippings from the lawn and transfers them to a bag. This procedure is not satisfactory since its successful application requires that the grass clippings be dry, which obviously is not always the case. If excess moisture is present, the cleaner will not pick up the grass clippings. In addition, the presence of wet, small particles fills up the pores of the bag so that the apparatus will not function. Still further, it is necessary to empty the bag at a remote location at frequent intervals.

Still another way of removing grass clippings from lawns is the application of the mechanical sweeper. This apparatus transfers the clippings into a container with a set of rotating brooms. Its use is not satisfactory because of its extremely limited capacity, because of the necessity of removing clippings from the broom area at frequent intervals, sweeping them back into the receiver, and because of the inability of the apparatus to function on irregular ground.

Accordingly it is the general object of the present invention to provide a power mower attachment, particularly a reel-type lawnmower attachment, which not only assists the mower in cutting the grass smoothly and evenly, but also picks up the clippings directly as they are cut and transfers them to a high capacity mobile storage unit so that the ground is left completely free of clippings, as well as of leaves, paper, small sticks and other debris which may have been present on it.

Other objects of the present invention are the provision of a power mower attachment which:

(1) Removes clippings, leaves and other debris efficiently, even when wet.

(2) Is highly maneuverable into any area which is accessible to the mower.

(3) Not only removes the material from the area being mowed, but also chops it up, if necessary, preventing it from winding about the moving parts of the apparatus, or clogging the apparatus.

(4) Is provided with a storage unit of high capacity which may be unloaded through the agency of the power unit which loads it.

(5) Is easily disassembled and cleaned.

(6) Is safe to operate in that sticks and stones, which normally are ejected forcibly from the mower, instead are transferred safely to the collection unit.

(7) Is adaptable for use with mowers of various classes applied to the cuttings or harvesting of grass or agricultural products of various types.

(8) Will not damage or litter lawns, sidewalks, curbings, or patios, across which it may be operated.

(9) May be controlled easily and accurately during use.

Generally stated, the power mower attachment accomplishing the foregoing and other objects of the invention comprises a blower unit having a vacuum intake and blower outlet and a wheeled grass storage trailer, flexibly coupled to each other and to a power mower.

Funnel means are mounted on the mower adjacent its cutting blade to collect the clippings. A flexible suction conduit interconnects the funnel and the suction intake of the blower. A flexible blower conduit interconnects the blower outlet and the trailer. The blower acts to generate an air stream through the funnel as well as through both conduits.

In the operation of the apparatus, an air stream sucked through the funnel holds the grass against the cutting bar of the mower so that it may be cut cleanly and uniformly. As soon as the grass is cut, the clippings are entrained in the air stream, and transferred through the blower into the trailer. Additionally, debris which may be present on the lawn is removed with the clippings, leaving a clean, uniformly cut lawn, irrespective of whether the grass is wet or dry.

The trailer is of high capacity and need be emptied infrequently. It is provided with outwardly opening rear doors and balanced on its wheels in such a manner that it may be tilted and its contents emptied through the doors with but little effort.

In the alternative, its front end is provided with a vent opening to which the suction intake of the blower may be connected. Thus by reversing the blower unit, and connecting its suction intake to the vent, the contents of the trailer may be sucked into the blower unit and discharged to a stack or any desired receiver.

Considering the foregoing in detail and with particular reference to the drawings, wherein:

FIG. 1 is a view in side elevation of the herein described power mower attachment, comprising a blower unit and a trailer, coupled to a reel-type power lawnmower;

FIG. 2 is a view in side elevation of the mower attachment uncoupled from the mower with the blower unit reversed and connected to the trailer for emptying the same;

FIG. 3 is a fragmentary sectional view through the front corner of the trailer of grass-clipping plow means used to assist in discharging grass clippings from the trailer;

FIG. 4 is a fragmentary view in side elevation of parts of the frame and cutting elements of the mower, illustrating the manner of connecting the mower attachment;

FIG. 5 is a fragmentary view in side elevation of parts of the rear wheel and axle of the mower, further illustrating the manner of connection of the mower attachment;

FIG. 6 is a view in front elevation of the novel blower unit, part of the blower casing being broken away better to show the interior construction;

FIG. 7 is a sectional view taken along line 7—7 of FIG. 6; and

FIG. 8 is a detail, sectional view taken along line 8—8 of FIG. 7 illustrating the manner of mounting knives in the blower unit of FIGS. 6 and 7, and the construction of the knives.

As shown in FIG. 1, the mower attachment of my invention is adapted for use with a power mower such as the reel-type riding mower indicated generally at 10. It comprises a blower unit indicated generally at 12, coupled to the mower, and a clipping-collecting trailer, indicated generally at 14, pivotally coupled to the blower unit.

Mower 10 has a frame sub-assembly including spaced top frame members 16, bottom frame members 18, rear side frame members 20 and a transverse plate 22. This sub-assembly supports a rotatably mounted, reel-type cutter 24, a cooperating cutting bar 26 and a roller 28. These elements are conventional and form no part of the invention.

Blower unit 12 is mounted on a wheeled frame 30, equipped with a forwardly extending forked tongue 32. The forward end of the tongue is coupled flexibly to the rear end of mower 10 by coupling means, the construction of which is shown particularly in FIG. 5.

Axle housing 34 of the mower mounts a pair of spaced pads, each comprising a short length of horizontally positioned channel iron 36 welded to the housing and a length of vertically arranged channel iron 38, placed back to back and welded together.

The bifurcation of the leading end of tongue 32 rotatably mounts a swivel bolt 40 which penetrates a hollow spacer 43 and is threaded into the cross member of a clevis 44. Clevis 44 makes possible vertical pivoting of the coupling by mounting a horizontal pivot pin 46 which penetrates a link 48.

Horizontal pivoting of the coupling is made possible by the provision of a vertically arranged pivot pin 50 carried by a horizontally arranged clevis 52. Thus complete flexibility of the assembly is afforded, swivel bolt 42 permitting swivelling of the coupling, pivot pin 46 permitting its vertical angular motion, and pivot pin 50 permitting its horizontal pivoting. This arrangement makes it possible for the blower unit to be coupled closely to the mower and to follow it in any devious course it may take.

The leading end of the coupling is fastened through clevis 52 to a subframe assembly which serves two functions: that of connecting the blower unit to the mower and that of supporting a grass-clipping-receiving unit to be described in detail later. The subframe assembly includes a pair of spaced longitudinal side pieces 54, a rearward cross piece 56 and a forward cross piece 58. The latter supports a pad 60.

Extending upwardly from side pieces 54 are a pair of posts 62 which may comprise short lengths of pipe. The upper end of each post is received in one of channel members 38, previously described, and secured thereto by means of bolt 64, thus removably securing the blower unit to the mower.

Blower unit 12 includes a powered cutting fan 66 of special design which is mounted on wheeled frame 30 and which serves several functions. First of all, it generates a powerful air stream by sucking air through a suction intake and discharging it through a blower outlet. Secondly it guides grass clippings through the blower in such a manner that they do not hang up and clog it. Third, it mounts an assembly of specially designed knives which chop and divide the clippings into fine, easily blown segments. Fourth, it may be assembled and disassembled easily for cleaning and repair.

The construction of the blower is shown in FIGS. 1, 6, 7 and 8.

The blower may be coupled through a direct drive to a motor 68, also mounted on wheeled frame 30. It is provided with a drive shaft 70 and with a throttle control which may be reached easily by an operator riding on power mower 10.

Fan 66 is housed in a special casing so designed that it may be removed completely and easily for cleaning and adjustment. To this end the casing includes a flanged back plate 72 to which is fixed at right angles an annular side wall segment 74 mounting an exterior, outwardly angled guide collar 76.

A flanged front plate 78 has a central opening 80 and a side wall segment 82 which, together with segment 74, forms the side wall of the casing. A collar 84 is welded to the exterior of front plate 78. It registers with opening 80 therethrough and with it forms a suction intake through which the clippings are introduced into the interior of the casing. It will be noted that the suction intake is arranged axially with respect to the casing.

The casing also is provided with a second opening and associated collar 86. These provide a blower outlet arranged tangentially of the casing. It receives the clippings from the blower and transfers them to trailer unit 14.

Front and back plates 72, 78 respectively, are coupled together for easy assembly and disassembly by means of bolts 88 which are received in openings provided in the flanges of plates 72, 78. The casing thus may be disassembled and assembled rapidly and easily when it is desired to clean or adjust the combination fan and cutting element which it houses.

The latter element, indicated generally at 90, includes a stout back plate 92 having a central opening 94 through which extends a hub 96.

Hub 96 receives shaft 70 of motor 68, to which it is fastened by means of a cap 98 and bolt 100, the latter being threaded axially into the end of shaft 70.

A conical deflection plate 102, which deflects the clippings as they are introduced into the blower unit, is welded to or formed integrally with hub 96.

A plurality of radially extending flat fan blades 104 are welded to back plate 92, normal thereto. The outer edges 106 of the fan blades are concavely arcuate to minimize grass clipping collection on the blades.

The fan blades also are provided with a plurality of laterally extending locating pins 108 having wide, case hardened heads and arranged in a characteristic pattern as required to locate knife blades 110, one on each fan blade, across the concavely arcuate outer edge thereof. Once located, the knife blades are secured in position by means of bolts 112.

Knife blades 110 have a design calculated to render them self-cleaning and easily removed for sharpening and replacement. An arcuate end surface 113 prevents the accumulation of clippings and helps render them self-cleaning. An angular deviation from flat, in the leading direction, evident particularly in FIG. 8, imparts a fan action to the blades. The angle $\alpha$ of deviation is somewhat variable, but as shown in FIG. 8 may be substantially 20° where the knife angle $\beta$ is 40°.

The axially arranged suction intake 84 of the blower is coupled flexibly to collecting funnel means positioned to receive the clippings directly as they are cut, while they are still in the air. The construction of the collecting funnel means and its manner of mounting are shown particularly in FIGS. 1, 4 and 5.

When viewed in plan, collecting funnel 120 is roughly triangular in shape, open at both leading and trailing ends, with the leading end being substantially the width of the cutting blades of the mower, and with the trailing end tapering down to a conduit opening. Additionally, the trailing end may be angled upwardly as shown in FIG. 5.

The leading end of collecting funnel 120 is provided with a pair of pivot pins 122, one on each side. Each pivot pin pivotally mounts a mounting plate 124 spaced from the side wall of funnel 120 by means of a round spacer 126. A bolt 128 removably secures each mounting plate 124 to side frame member 20 of the mower.

The rearward constricted end of funnel 120 is supported on front cross piece 58 of the sub-assembly previously described by means of which tongue 32 is coupled to the mower. Thus the base of the funnel rests on pad 60 and its two sides are confined between support posts 62. The collecting funnel accordingly may be rapidly attached to, and removed from, the mower simply by inserting its rearward end beneath axle housing 34 between posts 62 and securing its forward end by bolting mounting plates 124 to frame members 20.

Suction conduit means are provided for interconnecting the rearward end of collecting funnel 120 with axially arranged suction intake 84 of the blower. The conduit means is illustrated in FIGS. 1, 2 and 5 and comprises a flexible tube 130. The leading end of tube 130 is provided with a rectangular collar 132 which telescopes over the rearward end of funnel 120.

Extending laterally from each side of collar 132 is an angularly bent flat bracket 134. The outer end of the bracket is apertured and receives a J-bolt 136 on the end of which is threaded a wingnut 138. The engaging end of the J-bolt engages a loop 140 extending laterally from the side of funnel 120. A nut 142 prevents the J-bolt from falling off when the conduit is removed from the funnel.

The trailing end of conduit 130 is secured in suitable manner, permanently if desired, to suction intake collar 84 of the blower.

Sealing means are provided for sealing the wide forward end of funnel 120 as required to direct the flow of air around the sides of the funnel, rather than through the broad upper and lower surfaces. This creates an air current of high velocity about the sides and prevents the accumulation of grass clippings with resultant clogging of the funnel. The sealing means employed are shown in FIG. 4.

The upper forward surface of the funnel mounts a transverse rib 146. A first sealing flap 148, which may comprise a length of rubber, plastic or other flexible stock, has its leading end fastened to plate 22 and its trailing end pressed against rib 146. This seals off the opening at the top of the funnel.

A second transversely arranged sealing flap 150 has its rearward end bolted to the underside of funnel 120 and its forward end supported against the upper surface of cutting bar 26. This seals off the area beneath the funnel.

As a consequence of this arrangement, the violet air stream generated by fan 90 gathers the clippings as they are cut by the mower, while they still are in the air, transfers them through funnel 120, through the suction intake opening 84 of blower 66, through the tangentially positioned blower outlet 86 thereof, and thence into a collecting trailer 14.

As has been indicated previously, trailer 14 comprises a wheeled cart having a body 154 of substantial capacity. The top of the cart has screened vents 156 which permit the escape of air while retaining the clippings in the trailer. The rear end of the body is provided with hinged doors 158 which may be opened outwardly to permit emptying the body.

The forward end of the trailer is provided with coupling means for coupling the trailer pivotally to wheel frame 30 of blower unit 12.

In the illustrated form of the invention, the coupling means comprise a centrally located bracket 160 extending forwardly, centrally of the front of the trailer body. It mounts toggle latch 162.

One end of a longitudinally extending coupling bar 164 is releasably engaged by latch 162. The other end of the bar carries a pivotal coupling which may comprise a ball and socket joint 166.

Wheeled frame 30 supports an erect, U-shaped standard 168, the upper end of which mounts one of the elements of joint 166. Joint 166 thus permits pivoting of the blower and trailer units relative to each other while latch 162 permits facile coupling and uncoupling of the trailer.

Flexible conduit means also are provided for transferring the grass clippings from the blower unit to the trailer.

To this end, blower outlet 86 of the blower is bolted to a vertical conduit section 170, bent at right angles in the rearward direction. The upper end of conduit section 170 is coupled to the forward end of a length of flexible tubing 172. The rearward end of tubing 172 is fastened to a collar 174 mounted centrally of a closure plate 176, fastened preferably by snap fasteners 178 across an opening present on the top of the front end of body 154. Clippings transmitted by blower 66 thus pass through conduit 172 and into trailer body 154, where they are deposited.

Although, as pointed out above, the trailer may be emptied simply by opening doors 158 and tilting the trailer body, means also are provided for forcibly ejecting the trailer contents using blower unit 12 for this purpose. The manner in which this object of the invention is achieved is illustrated in FIGS. 1, 2 and 3.

The bottom of the front panel of trailer body 154 is formed with a centrally located aperture 180. A rectangular collar 182 dimensioned for coupling to the forward end of hose 130 is fastened to the exterior surface of the front of trailer body 154, aligned with opening 180.

Blower unit 12 may be reversed as illustrated in FIG. 2 and coupled to collar 182. The blower then will suck the clippings from trailer body 154 and eject them through conduit 172 onto a compost heap or into a suitable receiver.

A difficulty inherent in this operation, however, is caused by blocking of opening 180 by the lightly packed clippings in the trailer body. Accordingly I provide combination closure and plow means which close off the opening when the trailer is being filled but which will plow out a channel through the accumulated clippings when the trailer is to be emptied. It then is possible for blower 66 to create a strong current of air through the plowed-out channel so that the clippings are entrained and discharged through conduit 172. The means provided for this purpose is shown in FIG. 3.

The lower part of the inner surface of the front panel of trailer body 154 is provided with a pair of spaced vertical guideways 184 which extend partway only to the top of the trailer.

Sliding in these guideways is a combination closure member and plow 186. This comprises a rectangular body, the forward side of which is open; a pair of side walls provided with guide flanges dimensioned to slide in slides 184; a flat back wall; an angular top wall, which serves a plowing function and is equipped with handle 188; and an angularly bent bottom wall which seals off opening 180.

When using plow 186 front closure 176 is removed from the trailer body. The operator reaches through the opening, grasps handle 188, lifts the plow member upwardly, and removes it from the body. This clears a channel through the grass clippings so that free passage of air is afforded through opening 180 and coupling 182.

Operation

In operation, mower 10, blower unit 12 and trailer 14 are coupled together in the relationship of FIG. 1. Fan 66 of the blower unit is started, generating a high pressure flow of air through clipping collecting funnel 120, conduit 130, conduit 172 and into trailer 154.

As the mower works, the clippings are tossed upwardly and backwardly in the usual manner. They thereupon are entrained at once in the air stream rushing through funnel 120. In this effect seating flaps 148, 150 channel the air through the sides of the funnel, augmenting the clipping entrainment and also preventing accumulation of clippings around the edges of the funnel.

The clippings pass through suction intake 84 of blower 66 and are directed against cutting knives 110 mounted on fan blades 104. The knives reduce in size any large pieces of material which may be introduced and the air stream transfers the resultant reduced material out through tangentially arranged blower outlet 86, conduit 170, flexible conduit 172, and thence into trailer body 154. Here the clippings are screened out by screen 156 and accumulate in the trailer.

After the trailer is filled, it may be detached from the blower and emptied, simply by opening doors 158 and tilting the front of the trailer upwardly. In the alternative, blower unit 12 may be reversed, as shown in FIG. 2, and the forward end of flexible conduit 130 coupled to collar 182 at the forward end of the trailer. Front panel 176 of the trailer body then may be removed and plow 186 lifted upwardly to create a channel through the accumulated clippings in the trailer body. Operation of blower 66 thereupon will create an air stream through the trailer body, through conduit 130 and out through conduit 172, discharging the clippings from the trailer.

It accordingly will be seen that there is provided an apparatus in which the several objects of this invention are achieved and which is well adapted to meet the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. In the combination of a lawn mower, draft means therefor, a grass clipping storage trailer coupled to the mower, and conduit means interconnecting the mower and trailer: blower means for transferring the clipping from the mower to the trailer and comprising,
   (a) a casing having an axially arranged suction intake, and a tangentially arranged blower outlet, both communicating with the conduit means,
   (b) a rotary motor having a shaft extending into the casing,
   (c) a hub mounted on the shaft,
   (d) a plate mounted on the hub,
   (e) a plurality of fan blades mounted on the plate and extending radially thereof, and
   (f) a conical deflector plate mounted on the hub and extending between the fan blades for guiding clippings from the suction intake to the blower outlet.
2. The blower means of claim 1 wherein each fan blade has a concavely arcuate forward surface and including a plurality of knife blades and mounting means for mounting the knife blades one across the surface of each fan blade.
3. The blower means of claim 2 wherein each knife blade is bent angularly along its length in the leading direction.
4. The blower means of claim 1 wherein the casing has an annularly flanged back plate and an annularly flanged front plate, a pair of annular segmental side walls, one extending normally inwardly from the back plate and the other extending normally inwardly from the front plate in meeting relationship, and coupling means for coupling together the flanges of the front and back plates.

References Cited
UNITED STATES PATENTS 2,535,122  12/1950  Day _____ 146—107 X
2,725,702  12/1955  Ross _____ 146—107 X W. GRAYDON ABERCROMBIE, Primary Examiner U.S. Cl. X.R.
56—26; 241—101